US010492480B2

(12) United States Patent
Hyun

(10) Patent No.: US 10,492,480 B2
(45) Date of Patent: Dec. 3, 2019

(54) UNIVERSAL FISHING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 15/987,341

(22) Filed: May 23, 2018

(65) Prior Publication Data

US 2018/0338480 A1    Nov. 29, 2018

(30) Foreign Application Priority Data

May 24, 2017    (KR) .................. 10-2017-0063840

(51) Int. Cl.
*A01K 89/01* (2006.01)
*A01K 89/015* (2006.01)
*A01K 89/0155* (2006.01)

(52) U.S. Cl.
CPC .... *A01K 89/01925* (2015.05); *A01K 89/0155* (2013.01); *A01K 89/0192* (2015.05)

(58) Field of Classification Search
CPC .................. A01K 89/0192; A01K 89/01931
See application file for complete search history.

(56) References Cited

U.S. PATENT DOCUMENTS

| 2006/0006267 | A1* | 1/2006 | Hirayama | A01K 89/0192 242/223 |
| 2015/0272101 | A1* | 10/2015 | Kawamata | A01K 89/015 242/310 |
| 2016/0106083 | A1* | 4/2016 | Niitsuma | A01K 89/0192 242/310 |
| 2018/0199557 | A1* | 7/2018 | Toake | A01K 89/046 |

FOREIGN PATENT DOCUMENTS

| JP | 05060272 | 8/1993 |
| JP | 07001763 | 1/1995 |
| JP | 2013153659 | 8/2013 |
| KR | 200174209 | 3/2000 |
| KR | 100687898 | 2/2007 |
| KR | 101019509 | 3/2011 |
| KR | 101155404 | 6/2012 |
| KR | 101188291 | 10/2012 |
| KR | 101217155 | 12/2012 |

* cited by examiner

*Primary Examiner* — Emmanuel M Marcelo
(74) *Attorney, Agent, or Firm* — Cantor Colburn LLP

(57) ABSTRACT

Provided is a universal fishing reel in which an intermediate frame body is configured such that a third mounting portion for a spool of the frame body has a body surrounder covering the outer sides of both large-diameter portions having different sizes of spool bodies for winding a line to universally receive all different kinds of spools and the body surrounder has an inner diameter corresponding to the minimum large-diameter portions of different kinds of spools, or a first intermediate or second intermediate cover is configured such that a cover surrounder has an inner diameter corresponding to the minimum large-diameter portions of different kinds of (Continued)

spools when a gear-side first side cover or a palm-side second side cover has the cover surrounder covering the outer side of both large-diameter portions of a spool body.

2 Claims, 4 Drawing Sheets

UNIVERSAL FISHING REEL

CROSS REFERENCE TO RELATED APPLICATION

The present application claims priority to Korean Patent Application No. 10-2017-0063840, filed May 24, 2017, the entire contents of which is incorporated herein for all purposes by this reference.

BACKGROUND OF THE INVENTION

Field of the Invention

The present invention relates to a universal fishing reel to which spools having different outer diameters can be universally attached.

In detail, the present invention relates to a universal fishing reel that can actively deal with a system for manufacturing various kinds of products in a small quantity and can flexibly control productivity and total stock to be able to improve efficiency of production control and reduce the manufacturing cost by configuring an intermediate frame body in which a third mounting portion for a spool of the frame body has a body surrounder covering the outer sides of both large-diameter portions having different sizes of spool bodies for winding a line to receive all different kinds of spools and the body surrounder has an inner diameter corresponding to the minimum large-diameter portions of different kinds of spools, or by configuring, together with or separately from the body surrounder, a first intermediate or second intermediate cover in which a cover surrounder has an inner diameter corresponding to the minimum large-diameter portions of different kinds of spools when a gear-side first side cover or a palm-side second side cover has the cover surrounder covering the outer side of both large-diameter portions of a spool body.

DESCRIPTION OF THE RELATED ART

There is Korean Utility Model No. 20-0174209 (registered on Dec. 27, 1999), titled "Bait casting reel having spool detaching mechanism" in relation to a fishing reel in the related art.

This application relates to a spool detaching mechanism that can simply attach/detach a spool, in which a real frame has a predetermined number of fitting cuts and fitting protrusions on the inner side of an opening and a locking portions radially extending with the fitting protrusions are formed under the fitting protrusions. The spool detaching mechanism includes a cover coupled to the reel frame and a drag fixed to the cover and applying rotational resistance to the spool. The cover has a ring-shaped fitting edge fitted in the fitting cuts and rotating to the fitting protrusions to be coupled thereto. A locking member is disposed close to the opening of the reel frame to prevent rotation of the cover by coming in contact with a portion of the cover.

Furthermore, there is Korean Patent No. 10-0687898 (Feb. 21, 2007), titled "Reel body for double-bearing reel".

This application relates to a reel body, particularly, a reel body for a double-bearing reel, in which the reel body is mounted on a fishing rod to wind a fishing line on a spool rotating with rotation of a handle, in which two cylindrical portions eccentrically formed and having circumscribed circles cross each other. In the two cylindrical portions, a second cylindrical portion protruding outward forms a protruding portion, so even though rotational efficiency is improved by forming a protruding portion, machining of the outer surface is easy and a sense of incongruity is not easily generated by the two cylindrical portions. Accordingly, in the reel body for a double-bearing reel having a protrusion, the external aesthetic design and appearance can be improved.

Furthermore, there is Korean Patent No. 10-1188291 (registered on Sep. 27, 2012), titled "Reel unit for dual-bearing reel".

This application relates to a reel unit, particularly, a reel unit for a dual-bearing reel in which a handle is disposed on a side and a spool is disposed therein, in which an operation unit of an covering unit for opening/closing a second side cover is exposed inside from a second side plate, so the second side cover can be simply opened/closed and the second side cover can be opened and closed without touching a palm when a user holds the reel unit. Furthermore, the entire size of the reel can be reduced and the aesthetic appearance of the reel can be improved. Furthermore, in the dual-bearing reel in which the second side cover can be opened and closed by the second side plate, a second end of the second side cover is disposed on a shaft at an angle to be close to the second side plate, so there is no gap between the second side plate and the second side cover.

Furthermore, is Korean Patent No. 10-1019509 (registered on Feb. 25, 2011), titled "A bait reel with twitching dial".

The application provides a bait reel with a twitching dial that controls winding of a fishing line by controlling rotation of the spool during fishing. In the bait reel with a twitching dial, forward rotation of a spool by a user is finely controlled by the twitching dial connected by a combination of a handle shaft and a gear and the twitching dial is connected to the handle shaft by a guide disposed on the bait reel to smoothly and stably wind and unwind a fishing line on the spool of the bait reel.

However, these applications do not propose a technology related to a frame or a side cover that can universally receive different kinds of spools having different sizes, particularly, different outer diameters, so they are not associated with the present invention.

SUMMARY OF THE INVENTION

An object of the present invention is to provide a universal fishing reel that can actively deal with a system for manufacturing various kinds of products in a small quantity and can flexibly control productivity and total stock to be able to improve efficiency of production control and reduce the manufacturing cost by configuring an intermediate frame body in which a third mounting portion for a spool of the frame body has a body surrounder covering the outer sides of both large-diameter portions having different sizes of spool bodies for winding a line to receive all different kinds of spools and the body surrounder has an inner diameter corresponding to the minimum large-diameter portions of different kinds of spools.

Another object of the present invention is to provide a universal fishing reel by configuring, together with or separately from the universal body surrounder of the frame body, a first intermediate or second intermediate cover in which a cover surrounder has an inner diameter corresponding to the minimum large-diameter portions of different kinds of spools when a gear-side first side cover or a palm-side second side cover has the cover surrounder covering the outer side of both large-diameter portions of a spool body.

Another object of the present invention is to provide a universal fishing reel securing easy manufacturing and dimensional precision when there is additional machining for different kinds of spools having larger large-diameter portions because some or all of body surrounders or cover surrounders of an intermediate frame body or an intermediate frame body, which can universally receive spools having different outer diameters, have an inside-tapered structure changing outward.

In order to achieve the objects of the present invention, a universal fishing reel according to an aspect of the present invention includes: a frame body having first, second, and third mounting portions; a gear-side first side cover coupled to the first mounting portion of the frame body and having a first fitting portion; a palm-side second side cover coupled to the second mounting portion of the frame body and having a second fitting portion; and a spool including a shaft having both ends respectively coupled to the first and second fitting portions and a spool body combined with the shaft and disposed on the third mounting portion of the frame body, in which the spool body has a small-diameter portion formed at a center thereof; and large-diameter portions formed such that an outer diameter increases toward both ends from the small-diameter portion, the third mounting portion of the frame body has body surrounders covering the large-diameter portions of the spool body with a predetermined gap from outer sides of the large-diameter portions, and an intermediate frame body is configured such that one or both of the body surrounders have an inner diameter corresponding to minimum large-diameter portions of different kinds of spools to be received, in order to universally receive different kinds of spools having large-diameter portions having different sizes.

A universal fishing reel according to another aspect of the present invention includes: a frame body having first, second, and third mounting portions; a gear-side first side cover coupled to the first mounting portion of the frame body and having a first fitting portion; a palm-side second side cover coupled to the second mounting portion of the frame body and having a second fitting portion; and a spool including a shaft having both ends respectively coupled to the first and second fitting portions and a spool body combined with the shaft and disposed on the third mounting portion of the frame body, in which the spool body has a small-diameter portion formed at a center thereof; and large-diameter portions formed such that an outer diameter increases toward both ends from the small-diameter portion, the first or second side cover or both of the first and second side covers have cover surrounders covering the large-diameter portions of the spool body outside the first and second fitting portions, and an intermediate first side cover or second side cover is configured such that the cover surrounders have an inner diameter corresponding to minimum large-diameter portions of different kinds of spools to be received, in order to universally receive different kinds of spools having large-diameter portions having different sizes.

In the universal fishing reel, one or both of the body surrounders of the third mounting portion of the frame body or the cover surrounders of the first or second side cover may have a cross-sectional shape that changes outward, thereby having an inside-tapered structure.

The inside-tapered body surrounder of the third mounting portion of the frame body may be disposed close to the second side cover, the inside-tapered body surrounder may have an inward protrusion and an outward recession in a cross-section, an insertion of the second side cover may be disposed in the recession so that a radius of braking power generation position of a brake unit disposed on the spool and the second side cover to prevent backlash is increased.

The universal fishing reel according to the present invention may further include body surrounders of an intermediate frame body having an inner diameter corresponding to minimum large-diameter portions of a spool of different kinds of spools to be received, and cover surrounders of an intermediate first side cover or second side cover corresponding to minimum diameter-portions of another spool.

According to the universal fishing reel of present invention, it is possible to actively deal with a system for manufacturing various kinds of products in a small quantity and control productivity and total stock to be able to improve efficiency of production control and reduce the manufacturing cost by configuring an intermediate frame body in which a third mounting portion for a spool of the frame body has a body surrounder covering the outer sides of both large-diameter portions having different sizes of spool bodies for winding a line to receive all different kinds of spools and the body surrounder has an inner diameter corresponding to the maximum large-diameter portions of different kinds of spools, or by configuring, together with or separately from the universal body surrounder of the frame body, a first intermediate or second intermediate cover in which a cover surrounder has an inner diameter corresponding to the minimum large-diameter portions of different kinds of spools when a gear-side first side cover or a palm-side second side cover has the cover surrounder covering the outer side of both large-diameter portions of a spool body.

Furthermore, according to the universal fishing reel of present invention, it is possible to secure easy manufacturing and dimensional precision when there is additional machining for different kinds of spools having larger large-diameter portions because some or all of body surrounders or cover surrounders of an intermediate frame body or an intermediate frame body, which can universally receive spools having different outer diameters, have an inside-tapered structure changing outward. Furthermore, it is possible to possible to increase the radius of a braking power generation position of a brake unit disposed on the spool and the second side cover to prevent backlash by disposing the insertion of the second side cover in a recession of the inside-tapered body surrounder.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
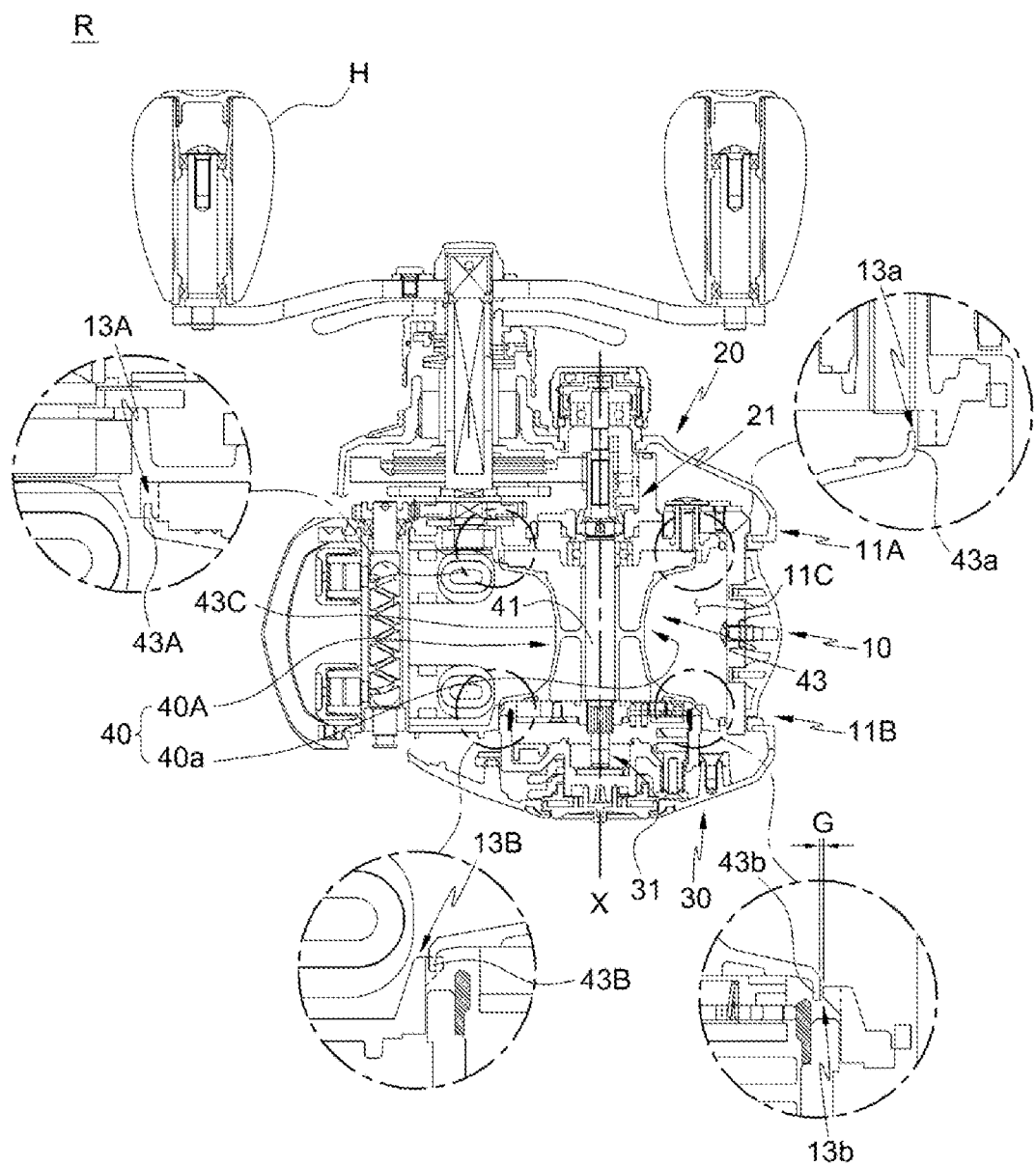
FIGS. 1 to 3 are cross-sectional views schematically showing different fishing reels.

Hereinafter, the present invention is described in detail with reference to the accompanying drawings.

The present invention may be modified in various ways and implemented by various exemplary embodiments, so that aspect (or embodiments) will be described in detail.

However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof. Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Well-known functions and configurations will not described herein when it is determined that detailed description of them may unnecessarily make the scope of the present invention unclear.

Terms such as 'a first ~' and 'a second ~' are used only for the purpose for distinguishing a constitutive element from other constitutive element, but constitutive element should not be limited to a manufacturing order, and the terms described in the detailed description of the invention may not be consistent with those described in the claims.

Figure 2:
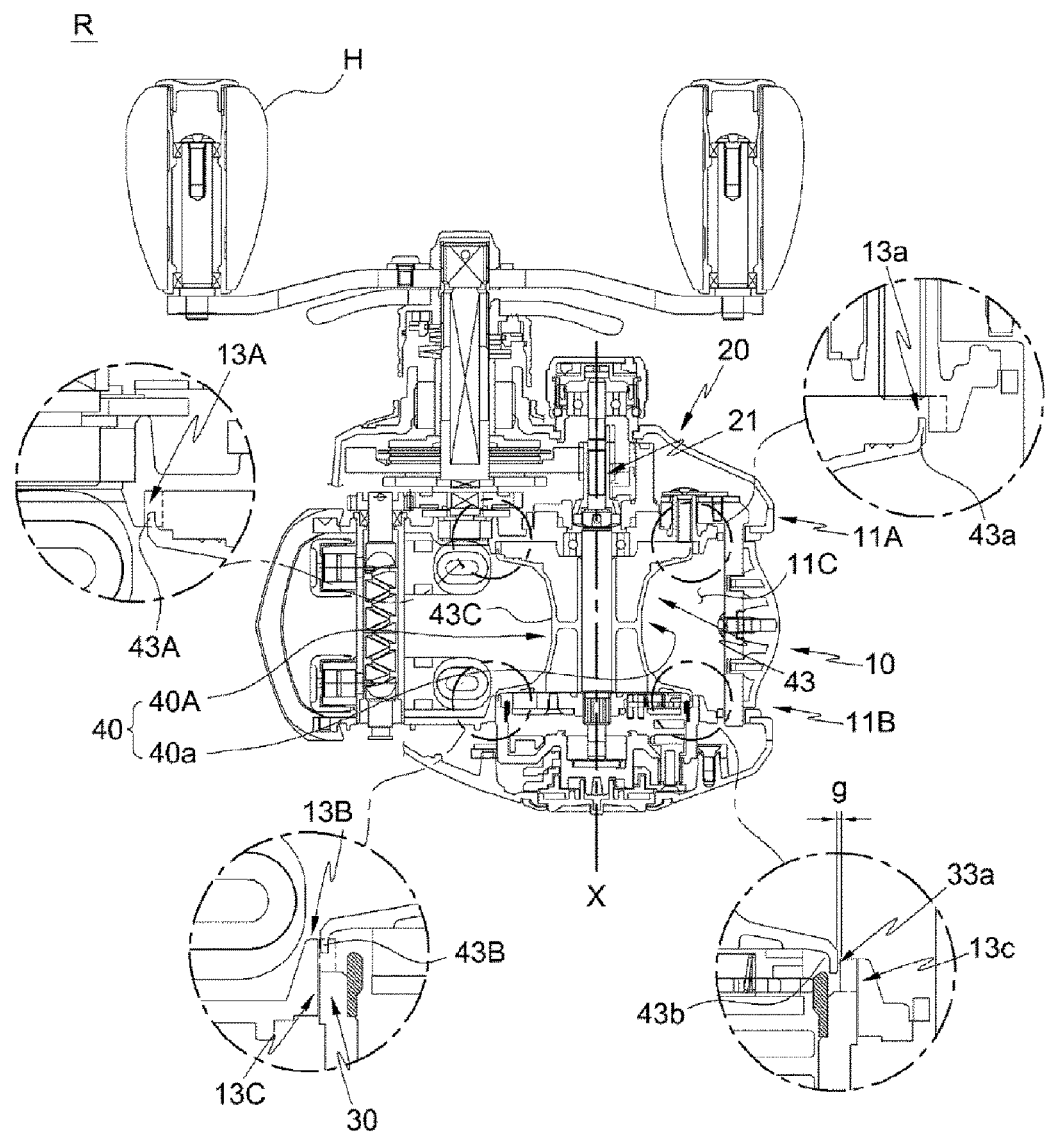
Figure 3:
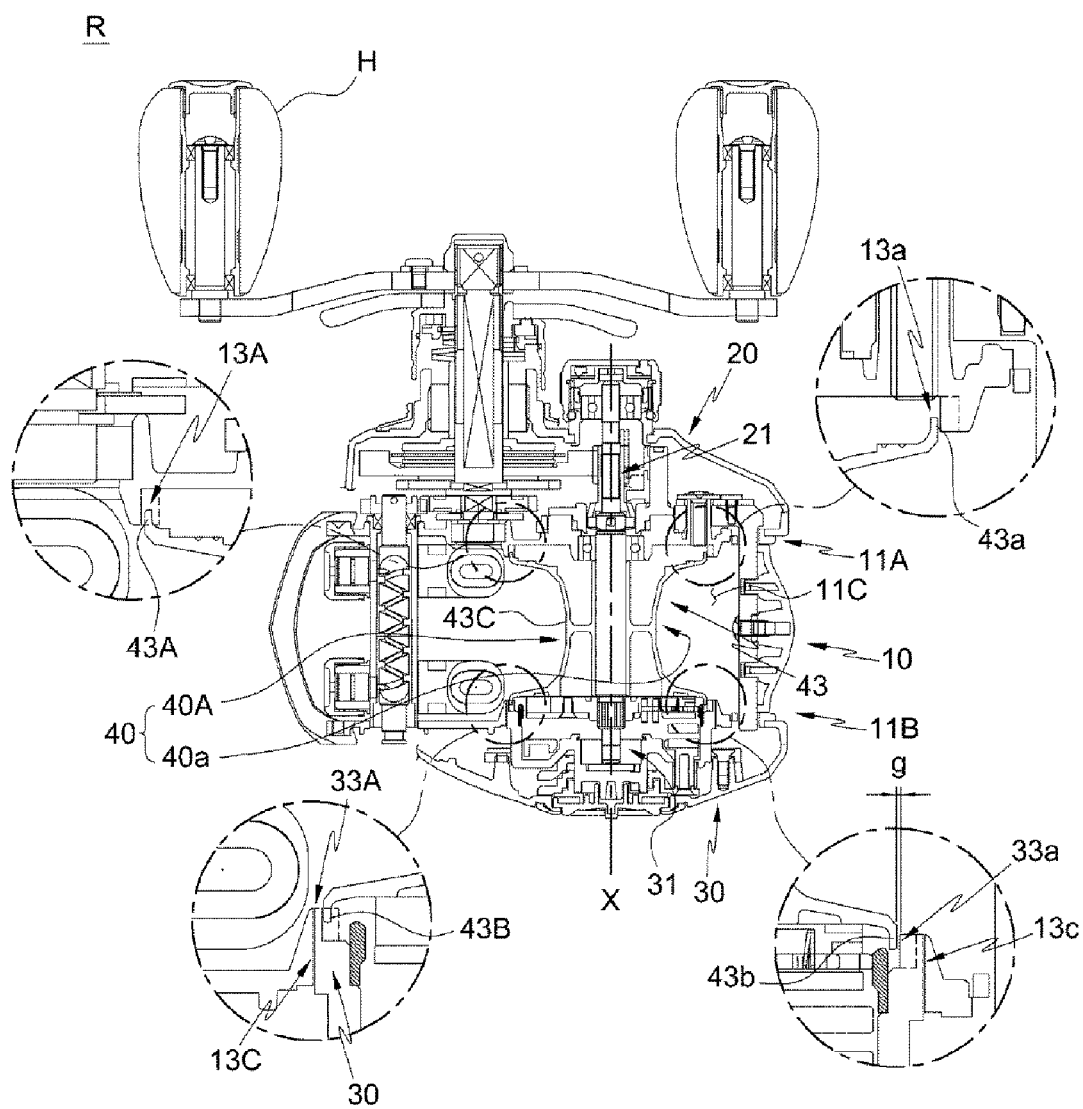

In FIGS. 1 to 3, the left side of an X axis shows a frame body or a side cover for receiving a spool having minimum large-diameter portions of different kinds of spools and the right side shows a frame body or a side cover for receiving a spool having relatively large large-diameter portions of different kinds of spool to show different fishing reels for the convenience.

The figures show fishing reels having two different kinds of spools, but if necessary, it is possible to configure universal fishing reels receiving spools having two to six different sizes, preferably, two to four different sizes, depending on the inner diameter of a body surrounder or a cover surrounder of an intermediate frame body or an intermediate side cover.

For reference, the up-down and left-right directions are defined as they are shown in the figures.

First, as shown in FIG. 1, a universal fishing reel R according to the present invention includes
a frame body 10,
a gear-side first side cover 20 and a palm-side second side cover 30 coupled to first mounting portions 11A and 11B, respectively, of the frame body, and
a spool 40 including a shaft 41 having both ends respectively coupled to first and second fitting portions 21 and 31 of the first and second covers and a spool body 43 combined with the shaft and disposed on the third mounting portion 11C of the frame body 10.

A handle H is disposed through a gear-side cover, that is, the first side cover 20 to operate with the spool.

Furthermore, the universal fishing reel includes a star drag nut (not indicated by reference numeral) controlling drag power to protect a fishing line by reducing the speed of a fishing line unwound from the spool when a fish goes away with a fish hook, and a tension nut (not indicated by reference numeral) disposed on a side of the frame body to adjust a casting distance by controlling the rotational speed of the spool.

For reference, the term 'side cover' is used when it indicates both first and second side cover herein.

The universal fishing reel R according to the present invention is characterized by being able to universally receive different kinds of spools, preferably, two to six kinds of spools, and more preferably, two to four kinds of spools in which the outer diameter of a spool body 43 for winding a line is different, particularly, a small-diameter portion 43C is formed at the center of the spool body 43 and large-diameter portions 43A and 43B are formed at both ends by increasing a diameter from the small-diameter portion 43C and have different outer diameters.

To this end, FIG. 1 shows a model in which a third mounting portion for spool of a frame body has a body surrounder covering the outer sides of both large-diameter portions of a spool body and the body surrounder has an inner diameter corresponding to a spool (right side of the X axis in FIG. 1) having minimum large-diameter portions of different kinds of spools to be received, in order to be able to universally receive all kinds of spools in which the large-diameter portions 43A and 43B of the spool body 43 have different sizes.

On the other hand, FIG. 2 shows a model in which side covers 20 and 30, particularly, a palm-side second side cover 30 has a cover surrounder covering the outer side of any one large-diameter portion of a spool body and the cover surrounder has an inner diameter corresponding to a spool (the right side of the X axis in FIGS. 2 and 3) having minimum large-diameter portions of different kinds of spools to be received, in order to be able to universally receive all kinds of spools in which the large-diameter portions 43A and 43B of the spool body 43 have different sizes.

If necessary, the surround covers may be provided on both of the first and second side covers or on any one of the side covers. Furthermore, a body surrounder of a frame body and a cover surrounder of a side cover may be provided for large-diameter portions of a spool body.

The frame body and the side cover that have the body surrounder and the cover surrounder are designed to have an inner diameter corresponding to different kinds of spools, preferably, two to six kinds of spools, and more preferably, two to four kinds of spools in which large-diameter portions have different outer diameters.

Accordingly, a universal fishing reel is formed by die casting or injection molding, in which the frame body and the side cover are formed to have a body surrounder and a cover surrounder corresponding to large-diameter portions of a spool having minimum large-diameter portions of different kinds of spools to be mounted.

Accordingly, the frame body and the side cover have both of the characteristics of an intermediate part and a finished part.

(Terms an 'intermediate' frame body and an 'intermediate' side cover are used in the specification and claims in consideration of the characteristics of a universal fishing reel and a frame body or a side cover that has an inner diameter corresponding to minimum large-diameter portions of different kinds of spools).

When a spool having relatively large large-diameter portions is mounted, the body surrounder and the cover surrounder are additionally machined such that the inner diameters are increased to fit to the outer diameters of the large-diameter portions of the spool.

(The sentence 'an intermediate part having an inner diameter corresponding to minimum large-diameter portions of different kinds of spools to be received' described in claim and the specification abbreviates the above meaning.

The present invention proposes the universal fishing reel to satisfy needs of consumers for various fishing patterns.

As the outer diameter of a spool, particularly, outer diameters of large-diameter portions (a change in size of large-diameter portions means a change in the entire size and shape of a spool) increases, the casting distance increases, but the fishing reel is relatively increased in size and the operation may become complicated. Accordingly, spools should be appropriately designed in size and produced to satisfy demands of users.

When the size of a spool (the size of large-diameter portions) is changed, the frame body, side cover, and clutch bar are also changed, because the change in size of a spool fundamentally results in a change of a frame body and a side cover (a change in size of a body surrounder and a cover surrounder).

Furthermore, in the related art, the sizes of parts of a fishing reel depend on the size of a spool, so there is a need for many molds and a large warehouse and the management and distribution are complicated to produce various kinds of parts in a small quantity.

Furthermore, the operating ratio of a manufacturing line is largely changed with a change in productivity, so it is difficult to observe the appointed date of delivery, the entire manufacturing cost is increased, and the manufacturing efficiency is deteriorated.

However, the universal fishing reel of the present invention can solve these problems.

In detail, the embodiment shown in FIG. 1 relates to a body surrounder of the frame body 10, as described above.

The universal fishing reel R of the present invention includes: a frame body 10 having first, second, and third mounting portions 11A, 11B, and 11C;

a gear-side first cover 20 coupled to the first mounting portion 11A of the frame body and having a first fitting portion 21;

a palm-side second cover 30 coupled to the second mounting portion 11B of the frame body and having a second fitting portion 31; and a spool 40 including a shaft 41 having both ends respectively coupled to the first and second fitting portions 21 and 31 and a spool body 43 combined with the shaft and disposed on the third mounting portion 11C of the frame body.

The spool body 43 of the spool 40 has a small-diameter portion 43c formed at the center of the spool body 43 and large-diameter portions formed such that the outer diameter increases toward both ends from the small-diameter portion.

In particular, in FIG. 1, a spool 40a of which the large-diameter portions 43a and 43b are relatively small is shown at the right side of the X axis and a spool 40A of which the large-diameter portions 43A and 43B are relatively large is shown at the left side of the X axis.

They are shown in the same way in FIGS. 2 and 3.

An intermediate frame body is manufactured by forming an initial frame body 10 to fit to body surrounders 13a and 13b corresponding to the outer diameters of the large-diameter portions of the spool of which the large-diameter portions are relatively small of the two kinds of spools 40A and 40A (if necessary, two to six or more, or two to four spools).

In order to make a frame body fitting to the spool of which the large-diameter portions are relatively large, body surrounders 13A and 13B having a relatively larger inner diameter are manufactured by additionally machining (cutting) the body surrounder of the intermediate frame body.

As a result, body surrounders are manufactured (by die casting, injection molding, cutting etc.) to fit to the spool of which the large-diameter portions are minimum of different kinds of spools to be mounted. The characteristics of the universal fishing reel of the present invention is clearly expressed in the specification and claims by using the expression 'minimum' large-diameter portions of a spool by using expression 'an intermediate frame body in which one or both of body surrounder have an inner diameter corresponding to the minimum large-diameter portions of different kinds of spools to be received is configured'.

Similarly, in relation to the cover surrounder of a side cover for the large-diameter portions of a spool, 'minimum' large-diameter portions of a spool is clearly stated by using expression 'an intermediate first side cover or second side cover is configured such that a cover surrounder has an inner diameter corresponding to the minimum large-diameter portions of different kinds of spools to be received'.

Furthermore, for rotation of the spool 40, the body surrounders 13a, 13b and 13A, 13B of the third mounting portion 11C of the frame body 10 are received with a predetermine gap G maintained between the outer sides of the large-diameter portions 43a, 43b and 43A and 43B.

In order to universally receive different kinds of spools of which the sizes of large-diameter portions are different, an intermediate frame body is configured such that one or both of the body surrounders have an inner diameter corresponding to the minimum large-diameter portions different kinds of spools to be received.

Furthermore, one or both of the body surrounders of the third mounting portion 11C of the frame body 10 has a cross-sectional shape that changes outward (in the shape of the inner side), thereby having an inside-tapered structure, so machining can be easily performed and the dimensions can be precisely changed when additional machining is required to mount different kinds of spools of which the large-diameter portions are larger.

In particular, at the right side of the X axis in FIG. 1, the body surrounder 13b close to the second side cover 30 of the body surrounders of the frame body 10 for the spool 40a having relatively small large-diameter portions 43a and 43b, that is, minimum large-diameter portions of different kinds of spools to be received has an inside-tapered structure.

It can be seen at the left side of the X axis that the body surrounder 13B close to the second side cover 30 of the body surrounders of the frame body 10 for the spool 40A having relatively large large-diameter portions 43B has been enlarged in inner diameter by additionally machining (cutting etc.) the right body surrounder 13b to fit to the large-diameter portions 43B of the spool.

(In FIGS. 1 to 3, structures before and after they are machined to correspond to large and small large-diameter portions of spools are shown at the left and right side of the X axis in relation to a body surrounder and a cover surrounder, and the portions that are changed in accordance with inner diameters are indicated by dotted lines).

Next, the body surrounder close to the first side cover 20 of the body surrounders of the frame 10 shown in FIG. 1 is described.

At the right side of the X axis in FIG. 1, the body surrounder 13a close to the first side cover 20 of the body surrounders of the frame body 10 for the spool 40a having relatively small large-diameter portions 43a and 43b, that is, minimum large-diameter portions of different kinds of spools to be received has the same inner diameter, so it corresponds to the body surrounder 13b having an inside-tapered structure.

It can be seen at the left side of the X axis that the body surrounder 13A close to the first side cover 20 of the body surrounders of the frame body 10 for the spool 40A having relatively large large-diameter portions 43B has been enlarged in inner diameter by additionally machining (cutting etc.) the right body surrounder 13a to fit to the large-diameter portions 43A of the spool. If necessary, the body surrounder close to the first side cover 20 can also have an inside-tapered structure.

Next, the body surrounders 13a and 13A close to the first side cover 20 shown in FIG. 2 have the same shape as those of FIG. 1.

The second side cover 30 has a cover surrounder 33a covering both large-diameter portions of a spool body with a predetermined gap 'g' from the outer sides of the large-diameter portions, outside the second fitting portion 31.

An intermediate second side cover is configured such that the cover surrounder 33a has an inner diameter corresponding to the minimum large-diameter portions 433b of different kinds of spools to be received, in order to universally receive different kinds of spools of which the large-diameter portions have different sizes.

If necessary, the first side cover 20 may have a cover surrounder covering large-diameter portions of a spool.

At the right side of the X axis in FIG. 2, a cover surrounder 33a of the second side cover 30 for the spool 40a having relatively small large-diameter portions 43a and 43b, that is, minimum large-diameter portions of different kinds of spools to be received is disposed with a predetermined gap 'g' from the large-diameter portion, and the body surrounder 13c of the frame 10 is disposed outside the cover surrounder 33a.

Furthermore, at the left side of the X axis in FIG. 2, the cover surrounder of the second side cover for the spool 40A having relatively large large-diameter portions 43B is disposed with a gap (particularly, a vertical gap (gap in the arrangement direction of the shaft 41) in the figure) from the large-diameter portion 43B, in which the second side cover 30 may be formed by additionally machining (cutting etc.) the cover surrounder 33a or, if necessary, another second side cover may be used.

At the left side of the X axis in FIG. 2, the body surrounder 13C of the frame body 10 is coupled with a lateral gap from the large-diameter portion 43B of the spool 40A (compared with the 'vertical gap' described above and meaning a gap from the cylindrical outer side of the large-diameter portion of the spool).

Next, the body surrounders 13a and 13A close to the first side cover 20 shown in FIG. 2 have the same shape as those of FIGS. 1 and 2.

The second side cover 30 has a cover surrounder 33a covering both large-diameter portions of a spool body with a predetermined gap 'g' from the outer sides of the large-diameter portions, outside the second fitting portion 31.

An intermediate second side cover is configured such that the cover surrounder 33a has an inner diameter corresponding to the minimum large-diameter portions 433b of different kinds of spools to be received, in order to universally receive different kinds of spools of which the large-diameter portions have different sizes.

That is, at the right side of the X axis, similar to that shown in FIG. 2, a body surrounder 13c of the frame body 10 is disposed outside the cover surrounder 33a.

On the other hand, at the left side of X axis in FIG. 3, the cover surrounder 33a of the second side cover 30 has been partially additionally machined (cut, etc.). Furthermore, at the left side of the X axis, the cover surrounder 33A of the second side cover 30 covers the relatively large large-diameter portions 43B of the spool 40A with a lateral gap therebetween (gap from the outer sides of the large-diameter portions).

At the left side of the X axis, similar to the right side, the body surrounder 13C of the third mounting portion of the frame body 10 is disposed outside the cover surrounder 33A.

If necessary, the structure having the cover surrounder the same as that of the second side cover 30 shown in FIG. 3 can be applied to the first side cover 20.

Meanwhile, the gap between the large-diameter portions of a spool and a body surrounder or a cover surrounder may be the outer diameter or less of the line wound on the spool.

Figure 4:
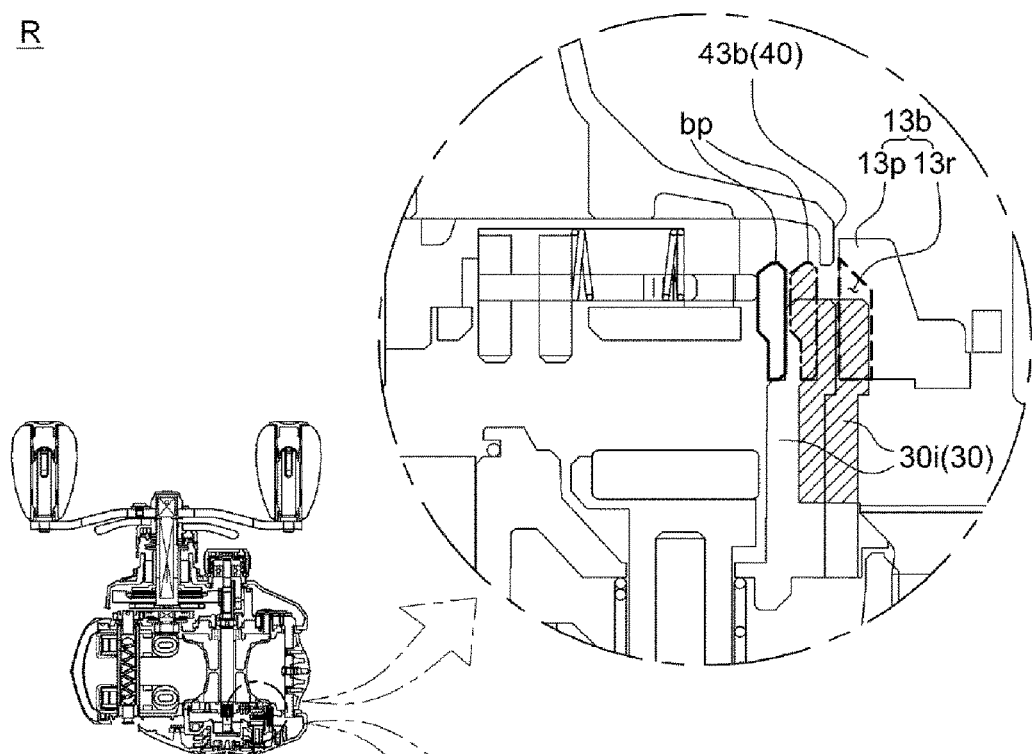
FIG. 4 is a view in which the radius of a point where braking power is generated in a brake unit by an inside-tapered body surrounder.
Figure 4:
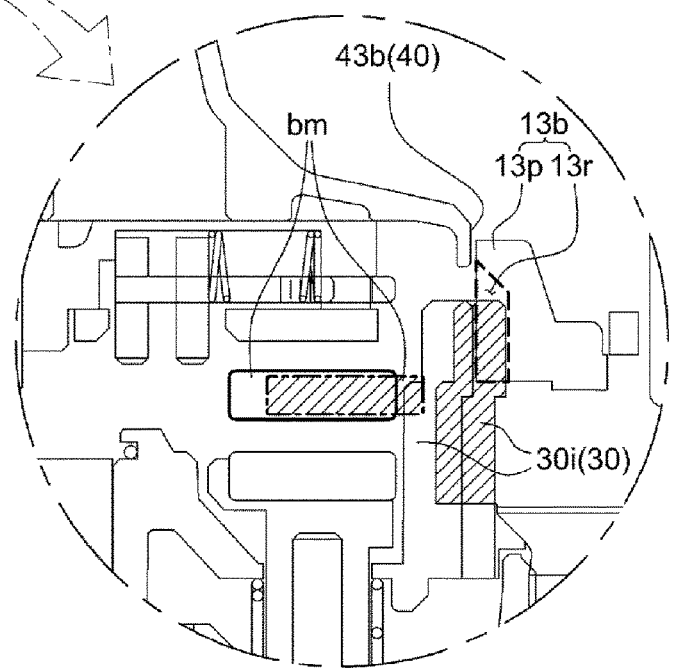

Next, as can be seen from FIG. 4, the universal fishing reel R according to the present invention has concept of the radius of a point where braking power of a brake unit for preventing backlash is generated, beyond the concept of the body surrounder of FIG. 1, that is, the concept that 'one or both of body surrounders of a third mounting portion of a frame body has a cross-sectional shape that changes outward in an inside-tapered structure', which is described hereafter.

In general, when a user casts to fish using a fishing reel (or a bait reel), the spool with a fishing reel wound thereon keeps rotating by inertia even after the fish hook with a bait is thrown, so backlash, that is, overlapping and entangling of the fishing line occurs.

In order to prevent the backlash, first, there is a method of braking a spool by generating friction on a brake shoe using centrifugal force.

Second, there is a method of braking a spool using magnetic force.

In the present invention, the inside-tapered body surrounder 13b of the third mounting portion 11C of the frame body 10 is disposed close to the second side cover 30.

The cross-section of the inside-tapered body surrounder 13b has an inward protrusion 13p and an outward recession 13r.

An insertion 30i (having a cylindrical shape) of the second side cover 30 is disposed in the recession 13r so that insertions having larger outer diameters can be used.

The insertion 30i of the second side cover 30 can increase the radius of a brake power generation point of a brake unit (using friction or magnetic force) disposed on the spool 40 and the second side cover 3 to prevent backlash.

FIG. 4 shows a brake pad bp disposed on the second side cover 30 of a friction brake unit in an upper circle of a dashed dotted line, which a brake shoe disposed on the spool (particularly, outside the large-diameter portion) is briefly shown.

A magnet bm disposed on the second side cover 30 of a magnetic brake unit is shown in a lower circle of a dashed dotted line in FIG. 4.

The insertion 30i of the second side cover 30 in the upper circle of a dashed dotted line can have a larger diameter when it is inserted in the recession 13r of the inside-tapered body surrounder 13b in comparison to when it is not inserted therein.

Accordingly, a large difference is generated in area for the brake unit, so, depending on whether there is a shaped area shown by a red solid line in the recession 13r, a larger brake pad bp (indicated by a thick dashed dotted line) or smaller (indicated by a thick dotted line) can be inserted (in the upper circle of a dashed dotted line) or a magnet bm can be inserted further outside (shown by a thick dashed dotted line) or more inside (indicated by a thick dotted line) (in the lower circle of a dashed dotted line).

Accordingly, the radius of the braking power generation position of the brake unit (using magnetic force or friction) is changed.

Furthermore, the braking power is also changed.

As a result, a brake unit generating stronger braking power can be applied to the universal fishing reel R according to the present invention due to the recession 13r of the inside-tapered body surrounder 13b.

According to the universal fishing reel of the present invention, a body surrounder of a frame body or a cover surrounder of a side cover that allows different kinds of spools to be mounted is applied and the number of molds and parts depending on the difference in outer diameter of spools, particularly, in outer diameters of large-diameter portions can be minimized by using both of the body surrounder and the cover surrounder. Accordingly, it is possible to save the cost for manufacturing molds and minimize the number of parts, so the manufacturing cost can be reduced and efficiency of production management is improved. Furthermore, even if spools having various outer diameters are manufactured, the manufacturing cost can be reduced, and accordingly, purchasing power and demands can be increased.

Well-known technologies related to a fishing reel, a frame body, a manufacturing method, various sizes and designs for each model, and the or more kinds of spools, body surrounder, and cover surrounder were described above, but they can be easily inferred and estimated by those skilled in the art.

Furthermore, although a fishing reel having a specific shape and structure was described with reference to the accompanying drawings, the present invention may be changed, modified, and replaced in various ways by those skilled in the art, and the change, modification, and replacement should be construed as being included in the protective range of the present invention.

What is claimed is:

1. A universal fishing reel comprising:
   a frame body having first, second, and third mounting portions;
   a gear-side first side cover coupled to the first mounting portion of the frame body and having a first fitting portion;
   a palm-side second side cover coupled to the second mounting portion of the frame body and having a second fitting portion; and
   a spool including a shaft having both ends respectively coupled to the first and second fitting portions and a spool body combined with the shaft and disposed on the third mounting portion of the frame body,
   wherein the spool body has a small-diameter portion formed at a center thereof, and large-diameter portions formed such that an outer diameter increases toward both ends from the small-diameter portion,
   the third mounting portion of the frame body has body surrounders covering the large-diameter portions of the spool body with a predetermined gap from outer sides of the large-diameter portions,
   an intermediate frame body is configured such that one or both of the body surrounders have an inner diameter corresponding to minimum large-diameter portions of different kinds of spools to be received, in order to universally receive different kinds of spools having large-diameter portions having different sizes,
   one or both of the body surrounders of the third mounting portion of the frame body have a cross-sectional shape that changes outward, thereby having an inside-tapered structure,
   the inside-tapered body surrounder of the third mounting portion of the frame body is disposed close to the second side cover,
   the inside-tapered body surrounder has an inward protrusion and an outward recession in a cross-section,
   an insertion of the second side cover is disposed in the recession, and
   a radius of braking power generation position of a brake unit disposed on the spool and the second side cover to prevent backlash is increased.

2. The universal fishing reel of claim 1, wherein only any one of the body surrounders of the third mounting portion of the frame body covers any one of the large-diameter portions of the spool body,
   the first or second side cover has a cover surrounder covering the other one of the large-diameter portions of the spool body with a predetermined gap from an outer side of the other large-diameter portion, outside the first and second fitting portions, and
   and intermediate first side cover or second side cover is configured such that the cover surrounders have an inner diameter corresponding to minimum large-diameter portions of different kinds of spools to be received, in order to universally receive different kinds of spools having large-diameter portions having different sizes.

* * * * *